2,697,028
Patented Dec. 14, 1954

2,697,028

METHODS OF PRODUCING DEHYDROGENATED HYDROCARBON BODIES

William O. Baker, Morristown, and Richard O. Grisdale, Short Hills, N. J., assignors to Bell Telephone Laboratories, Incorporated, New York, N. Y., a corporation of New York No Drawing. Application April 28, 1951, Serial No. 223,633

10 Claims. (Cl. 23—209.1)

This invention relates to methods of forming thermally dehydrogenated products of certain relatively high molecular weight, highly cross-linked hydrocarbons and to the products so produced.

These hydrocarbons, of which polymerized divinyl benzene can be taken as an example, can be formed in any desired physical shape, as by polymerization of lower molecular weight materials, and are then subjected to elevated temperatures at which dehydrogenation of the hydrocarbon occurs without destruction of its physical shape. By limiting the temperature to which the hydrocarbon is heated or the time of heating and thus controlling the degree of dehydrogenation, a wide variety of dehydrogenation products having useful properties can be produced. Coupled with the dehydrogenation, there is of necessity some rearrangement of the network of carbon atoms forming the base of the hydrocarbon molecules, but the degree of dehydrogenation is a measure of this rearrangement.

The products range from the mildly dehydrogenated non-conductive substances, containing for instance about 6 per cent hydrogen by weight and produced by heating at about 250° C., which are useful in the form of films as optical filters, through the more highly dehydrogenated products which show increasing electrical conductivity and exhibit photoconductivity and which are useful as radiation counters, up to the substantially completely dehydrogenated carbon materials which are produced by heating to temperatures from about 850° C. to about 1300° C. or higher and which are capable of a variety of uses as will be discussed below.

Of these products, the ones capable of widest application are those which are highly dehydrogenated, which contain for instance not more than 1 per cent hydrogen by weight and preferably not more than .5 per cent hydrogen. These are lustrous, black, hard, strong coherent substances having an electrical resistivity at 25° C. varying between about $10^5$ ohm-centimeters for those containing about 1 per cent hydrogen and about $10^{-2}$ ohm-centimeters or less for those containing .02 per cent hydrogen or less. It is in connection with the production of the highly dehydrogenated substances, and particularly of shaped bodies of these substances, that the invention will first be specifically described.

It has previously been suggested that integral shaped bodies of carbon be formed without the use of binders by forming shaped bodies of natural or synthetic, oxygenated polymeric materials such as regenerated cellulose, phenolic resins or polyester resins and heating the bodies in non-oxidizing atmospheres to temperatures at which substantially all of the hydrogen and oxygen are driven off so that a body of carbon remains. It has also been proposed to treat coal tar still residues in the same manner.

The formation of carbon in a predetermined coherent shape from hydrocarbons of known and controlled composition has, in the past, been limited to the pyrolysis of gaseous or volatile hydrocarbons in the gas phase and the deposition of a carbon film on a refractory surface by means of this pyrolysis. Although a lustrous, hard, coherent carbon is produced in this manner, the formation of shapes other than film coatings is not feasible by this process and, moreover, the uniform deposition of films can be accomplished only on surfaces of relatively simple shape, all portions of which are readily accessible to the gas phase pyrolytic process.

As indicated above, by means of the process of the present invention, the essentially carbon materials of the present invention are produced by pyrolysis, in situ, of non-volatile hydrocarbons or hydrocarbon-forming substances of definite and known structure. By means of the pyrolysis in situ, it is possible to produce the carbon in the form of unitary, strong, coherent bodies in a variety of predetermined shapes without the use of binders. This process not only is capable of producing bodies of carbon in a variety of shapes but also produces forms of carbon having unique properties, distinct from the properties of carbons heretofore reported.

When branched, high molecular weight hydrocarbons, particularly the cross-linked hydrocarbon polymers, are directly subjected to pyrolysis by heating in a non-oxidizing atmosphere, certain conditions must be observed or else all, or all but a small fraction, of the original material is lost by volatilization or the products of decomposition. The first condition which must be observed is the use of a hydrocarbon possessing an adequate degree of cross-linking in its molecular structure. If this degree of cross-linking is sufficiently high, as in polymerized trivinyl benzene, a good yield of carbon, such as 60 per cent of the weight of the original polymer, can be obtained directly upon pyrolysis without any other preliminary treatment.

However, in the more usual situation a lower degree of cross-linking is present than the minimum required for a high yield without other treatment. Thus, when polymers of divinyl benzene are subjected to pyrolysis by heating in a non-oxidizing atmosphere, only 6 per cent or 7 per cent by weight of the original material will remain as carbon. Shaped bodies of such material, when subjected to pyrolysis in this manner, may retain their shape but it is found that all of the body with the exception of a thin surface layer disappears, leaving a hollow shell of carbon.

Although the hollow products of such a pyrolysis may be useful for some purposes, it is more often desirable that more substantial carbon bodies be produced. This is accomplished by subjecting the hydrocarbon body, before pyrolysis, to a treatment which inhibits or retards the loss of carbon by the formation of volatile hydrocarbons during pyrolysis. The formation of volatile hydrocarbons results from the scission of carbon-to-carbon bonds, or depolymerization, in the hydrocarbon as opposed to the scission of carbon-to-hydrogen bonds which is responsible for dehydrogenation. It is therefore the purpose of the treatment before pyrolysis to retard carbon-to-carbon scission while permitting carbon-to-hydrogen scission.

When the hydrocarbon is subjected to pyrolysis after this pretreatment, the predominant reaction is one of dehydrogenation (with carbon rearrangement to take care of the resulting unsaturation) so that ultimately a substantial part of the original carbon skeleton of the hydrocarbon remains, with all but a small amount of the hydrogen removed. By use of such a treatment, yields of carbon up to and in excess of 50 per cent by weight of the original hydrocarbon can be obtained with polymers giving a yield of only 6 per cent or 7 per cent without the treatment. The greatest improvement in yield by the use of this treatment is obtained with those polymers which give the smallest yields without the treatment but some improvement results with all polymers.

A hydrocarbon material which has an intrinsic vapor pressure not greater than $10^{-4}$ centimeter of mercury at 300° C., either initially or after the pretreatment described above, can be subjected to pyrolysis to give a high yield of the essentially carbon bodies of the present invention. As indicated above, hydrocarbons which can be satisfactorily subjected to pyrolysis either with or without pretreatment must initially not only possess a relatively high molecular weight but also have a highly branched or cross-linked carbon skeleton having a network structure. The most useful of these substances are the relatively highly cross-linked hydrocarbon polymers.

The effect of extensive cross-linking in retarding loss of hydrocarbon fragments due to carbon-to-carbon bond scission during pyrolysis appears to be twofold in view of what may reasonably be assumed to be the mechanism of pyrolysis. It may be assumed that during pyrolysis carbon-to-carbon bond scission, or depolymerization, occurs simultaneously with carbon-to-hydrogen bond scission, or dehydrogenation. The dehydrogenation creates an unsaturation which tends to lead to further polymerization or cross-linking at the same time that the depolymerization due to carbon-to-carbon scission is occurring. Thus the cross-linked polymer configuration, by merely providing a plurality of bonds linking the various portions of the polymer molecule to the remainder of the molecule, tends to hold these portions in the molecule, even after one or more bonds have been broken, until new bonds are created by dehydrogenation.

The cross-linking appears not only to reduce the splitting off of molecular fragments when carbon-to-carbon bond scission occurs but also to retard the carbon-to-carbon bond scission itself. It is apparent from the bond energies (about 59 kilogram-calories per mol for the carbon-to-carbon bond and about 87 kilogram-calories per mol for the carbon-to-hydrogen bond) that the breaking of the bonds is not the result of simple thermal dissociation at the temperatures employed for pyrolysis. Therefore the scission appears to be the result of a free radical chain reaction. In a cross-linked polymer network, the network points apparently tend to inhibit propagation of the depolymerizing chain reaction.

However, as indicated above, the mere existence of a highly cross-linked structure in a hydrocarbon polymer is not necessarily sufficient to prevent an excessive loss of material due to depolymerization during pyrolysis. For a high yield of carbon, it is necessary with most polymers to subject the cross-linked material to a treatment which will result in the further inhibition of the depolymerizing chain reaction, at least during the early stages of the pyrolysis before extensive dehydrogenation has securely bound the bulk of the carbon atoms to the mass being subjected to pyrolysis.

This treatment to inhibit depolymerization involves the introduction of molecular or submolecular atomic groupings which are capable of inhibiting the propagation of free radical chain reactions of the type which appear to be associated with the depolymerization. The introduction of such groupings is most readily and effectively accomplished by baking the cross-linked hydrocarbon body in air or an oxygen-containing atmosphere. The nature of the change which takes place in the hydrocarbon molecules, and which is responsible for inhibiting depolymerization during the subsequent pyrolysis, is not fully known. This inhibition appears to be the result of the addition of oxygen to the molecules. The evidence indicates that it is oxygen added to side chains or groups, rather than as a linkage in the network structure, which is responsible. The amount of oxygen taken up during the preliminary baking may constitute as much as 15 per cent by weight of the resultant material if the baking is carried on for a prolonged period.

Similar results are obtained by baking the hydrocarbon body in other gases capable of introducing depolymerization inhibiting groups, such as ammonia, nitric oxide, hydrogen sulfide, sulfur dioxide or methyl amine. Instead of forming the inhibiting groups indirectly by baking in a particular atmosphere, the inhibiting groups can be introduced directly by introducing compounds known to be depolymerization inhibitors, such as beta naphthol, the leuco base of 1,4 diamino anthraquinone, t-amyl phenol sulfide, benzaldehyde and other aromatic aldehydes, phenyl beta naphthylamine, hydroquinone, anthraquinone and other aromatic ketones, t-butyl catechol and other substituted phenols, p-phenylene diamine and its derivatives, as well as the mercaptans and the nitro and nitroso compounds. The compounds can be added, in amounts of from about 0.5 per cent to about 5 per cent for instance, by swelling the hydrocarbon bodies in solutions of the compounds in volatile solvents and then allowing the solvents to evaporate.

As indicated above, the presence of inhibiting groups is effective in permitting the production of a coherent, unitary, shaped body containing a relatively high percentage of the carbon originally present, only if the hydrocarbon has an adequately cross-linked molecular structure. The cross-linking of the hydrocarbon is adequate if the hydrocarbon body, prior to the pretreatment referred to above, does not swell to more than five times its original volume in a solvent having no substantial heat of solution, such as benzene or carbon tetrachloride. Preferably the cross-linking is such that the swelling under these conditions is less than 1.25 times the initial volume and the best results are obtained when the swelling is negligible.

In some instances, to be discussed more fully below, a hydrocarbon polymer may be employed which is structurally capable of being polymerized to such a cross-linked state as described above but which, prior to the pretreatment by baking in air or other suitable gas, has not yet achieved this degree of polymerization. During the baking treatment to incorporate depolymerization inhibiting groups, the polymerization may simultaneously be advanced to the point where the cross-linking is sufficient to permit a high yield to be obtained on subsequent pyrolysis. Thus, whether the full requisite cross-linking is achieved before or after pretreatment, the final product in each case possesses the required combination of cross-linking and inhibiting groups to permit adequate dehydrogenation by pyrolysis to obtain a high carbon yield. In either case, pretreatment by baking renders the product incapable of noticeable swelling in a solvent having no substantial heat of solution.

Hydrocarbon polymers having or capable of achieving the requisite degree of cross-linking may be derived from a variety of sources. The most direct source is from the polymerization of a hydrocarbon monomer or a mixture of hydrocarbon monomers containing olefinic or acetylenic unsaturated bonds and having an average active functionality sufficiently greater than two to permit the required cross-linking. Each olefinic double bond contributes a functionality of 2 to the monomer and each acetylenic triple bond contributes a functionality of 4.

Thus monomers such as divinyl benzene, with a functionality of 4; trivinyl benzene, with a functionality of 6; divinyl naphthalene, with a functionality of 4; vinyl acetylene, with a functionality of 6; divinyl acetylene, with a functionality of 8; bis (p-vinyl phenyl) methane, with a functionality of 4; or vinyl butadienyl acetylene, with a functionality of 10, may be polymerized to yield hydrocarbon polymers of the required degree of cross-linking for the purposes of the present invention. Similarly, naturally occurring unsaturated short chain hydrocarbon polymers, such as lycopene or beta carotene ($C_{40}H_{56}$), which contain eleven conjugated double bonds in their molecules, may be subjected to further polymerization to produce highly cross-linked materials for use in the process of the present invention.

Mixtures of these polymerizable materials, of functionality greater than 2, with one another or with bifunctional hydrocarbon monomers, may be used provided the average available functionality is sufficiently in excess of 2 to permit the required cross-linking. An average functionality of at least 2.4 is sufficient. The average functionality of a mixture of monomers is computed by multiplying the mol fraction of each monomer in the mixture by the functionality of that monomer and adding together the value obtained for all of the monomers.

The most desirable cross-linked hydrocarbon polymers for the purposes of the present invention are formed from polyvinyl aromatic hydrocarbons such as any of the isomeric forms of divinyl benzene, trivinyl benzene and divinyl naphthalene or their homologues containing, on the aromatic ring or rings, one or more alkyl substituents, particularly alkyl substituents containing up to six carbon atoms. Of the divinyl aromatic hydrocarbons, divinyl benzene is particularly suitable, particularly when copolymerized with other polymerizable hydrocarbon monomers such as styrene, methyl styrene, ethyl styrene, acetylene, phenyl acetylene, vinyl acetylene, stilbene, indene, vinyl naphthalene or fluorene.

Such copolymers preferably contain at least 20 per cent by weight of the divinyl aromatic hydrocarbon. When the monomer with which it is copolymerized is bifunctional, this minimum of 20 per cent divinyl compound is essential to insure adequate cross-linking. When a divinyl aromatic hydrocarbon is copolymerized with a bifunctional monomer, preferably not more than 50 per cent, and more preferably not more than 40 per cent of the mixture of the two monomers is made up of the bifunctional compound. By maintaining a minimum of 20 per cent of polyfunctional divinyl compound in mixture with a bifunctional monomer, an average functionality, on a weight basis, of at least 2.4 is maintained.

Particularly desirable results are obtained where the polymer is formed entirely of vinyl aromatic hydrocarbon monomers, particularly vinyl benzenes. Such polymers may be formed, for instance, of divinyl benzene alone or in mixture with a monovinyl benzene such as styrene, methyl styrene, ethyl styrene or some other vinyl benzene having, on the benzene ring, one or more alkyl substituents, particularly those containing up to six carbon atoms. A commercially available technical form of divinyl benzene, containing about 50 per cent divinyl benzene isomers, about 40 per cent vinyl ethyl benzene and the remainder inert diethyl benzene was found well suited for the formation of hydrocarbon polymers to be subjected to the process of the present invention.

As indicated above, if the degree of cross-linking is sufficient, high carbon yields can be obtained by the pyrolysis of hydrocarbon polymers which have not been subjected to any depolymerization inhibiting pretreatment. Polymers formed from polymerizable materials containing at least 50 per cent by weight of one or more hydrocarbon monomers having a functionality of at least 6, fall in this class. This is particularly true of such polymers formed from monomers having a molecular structure consisting of vinyl groups attached to a residual hydrocarbon grouping having a hydrogen to carbon ratio no greater than 1. Aromatic hydrocarbons containing at least 3 vinyl substituents, particularly trivinyl benzene, are the most effective members of this group.

Copolymers of monomers having a functionality of at least 6 with hydrocarbon monomers of lower functionality will give decreasing carbon yields, as the proportion of lower functionality monomer is increased, when subjected to pyrolysis without pretreatment. Pretreatment will, however, raise the yield to high values as indicated above.

Polymerization of the monomers or mixtures of monomers from which the products of the present invention are produced can be accomplished in the conventional manner with either the original monomers or the partially polymerized material, while still plastic, being formed in the desired shape. Thus polymerization is conveniently accomplished by adding 1 per cent by weight of benzoyl peroxide to the material to be polymerized and then heating it to a temperature at which polymerization occurs at a practical rate, as for instance at temperatures between 60° C. and 150° C. Polymerization is ordinarily continued until a polymer is produced which, as stated above, does not swell to more than five times its original volume in a solvent having no substantial heat of solution.

As is known in the art, polymerization may be accomplished with larger or smaller amounts of benzoyl peroxide as, for instance, between 0.5 per cent and 4 per cent. Other polymerization catalysts such as cumene hydroperoxide, t-butyl hydroperoxide, 1-hydroxy cyclohexyl hydroperoxide-1, lauryl peroxide, stearyl peroxide or other acyl peroxides can be used in amounts comparable to those used for benzoyl peroxide. Promoters such as cobalt naphthenate, iron naphthenate, dimethyl aniline, ethyl mercaptan, butyl mercaptan, dodecyl mercaptan, or azo bis-butyronitrile may be used with the polymerization catalyst, if desired, in any suitable amount as, for instance, between .05 per cent and 0.2 per cent by weight of the polymerizable material.

The shaping of the material which is polymerized may be accomplished in a variety of ways. One of the most useful forms of the carbon which is ultimately produced is in the shape of small spheres. Spherical polymer shapes, from which such carbon spheres can be produced, can be formed by the so-called pearl or bead polymerization. Divinyl benzene and trivinyl benzene, alone or in mixture with other polymerizable monomers and particularly in mixtures in which the only other polymerizable materials are other vinyl benzenes, are particularly suited to polymerization by this process.

In the formation of polymer spheres by this method, the material to be polymerized is agitated, as by rapid stirring, together with a body of a non-solvent suspension liquid, such as water. Under the influence of the continuing agitation, the material to be polymerized breaks up into spherical globules dispersed in the suspension liquid. The entire system is maintained at a polymerizing temperature until rigid, non-tacky polymer spheres are produced. The polymerization in suspension can be continued until the requisite degree of cross-linking, as set forth above, has been achieved or the polymer spheres can be removed from the suspension after they have become rigid and non-tacky and can be subsequently heated to complete their polymerization.

The manner in which a partial yield of polymer spheres of mixed sizes can be produced by this method is known to the art. A procedure by which high yields of spheres falling within a narrow size range can be produced is described and claimed in the copending application of F. H. Winslow, Serial No. 182,309, filed August 30, 1950.

According to this procedure, a liquid mass of material to be polymerized, which contains a polymerization catalyst, is rapidly stirred by a rotary stirrer into suspension in at least five times as much by volume, and preferably ten to fifteen times as much by volume, of water or of an aqueous solution of an inorganic salt, the pH of which is maintained at a value between 3 and 7 and which has dissolved in it between 0.25 per cent and 5 per cent, and preferably about 2 per cent, of a suspension stabilizing agent comprising polyvinyl alcohol having a degree of hydrolysis of at least 95 per cent and preferably at least 98 per cent and having an intrinsic viscosity in aqueous solution of between 0.3 and 0.9. The temperature of the system is maintained between about 60° C. and 100° C., and preferably between about 75° C. and 85° C., until the suspended spheres have polymerized to a rigid, non tacky state.

In this process, an increase in the rate of agitation and an increase in the concentration of the polyvinyl alcohol in the aqueous suspension medium tend to decrease the size of the spherical polymer particles which are produced. Similarly, the use of polyvinyl alcohols of decreasing degrees of hydrolysis or of increasing intrinsic viscosities tends to decrease the size of the spheres. With polyvinyl alcohols having degrees of hydrolysis and intrinsic viscosities falling within the range set forth above, a high yield of unagglomerated spheres, the greater proportion of which has a diameter falling within a narrow range of size distribution, can be obtained with average diameters lying between .05 millimeter and 1.5 millimeters. Larger spheres can be obtained in lower yield by decreased agitation and lower concentrations of polyvinyl alcohol, particularly when the lower viscosity grades of polyvinyl alcohol are used. When it is desired to produce spheres of smaller diameter, down to .005 millimeter for instance, a polyvinyl alcohol of lower degree of hydrolysis, for instance about 77 per cent, and a higher intrinsic viscosity, for instance about 1.0, may be used.

As indicated above, the spheres obtained in this process may either be fully polymerized to the requisite degree of cross-linking for subsequent pretreatment and pyrolysis or be brought to this degree of cross-linking by subsequent heating after removal from suspension. The fraction of the polymerized material which is removed from suspension as agglomerated spheres, rather than individual spheres, can be treated in the same manner to produce agglomerated carbon spheres useful for some purposes.

In a similar manner, carbon rods or filaments of various diameters can be produced according to the process of the present invention by first forming polymer rods or filaments. The formation of such polymer rods or filaments can conveniently be accomplished by inserting the monomer or monomer mixture, containing the requisite polymerization catalyst, in a glass capillary tube of the desired diameter and gradually moving the tube longitudinally into a zone in which a polymerizing temperature is maintained, so that the monomer polymerizes gradually from one end of the tube to the other. This method of polymerization minimizes cracking from the large volume shrinkage during polymerization. After the polymer has achieved the required degree of cross-linking, it can be removed from the tube, as by breaking away the tube or dissolving it or by other means. The resulting polymer rod or filament can be converted to carbon by the process of the present invention. This method of polymerization is also particularly adapted to the formation of polymers from vinyl aromatic compounds, particularly from trivinyl benzene or divinyl benzene or mixtures of these substances with each other or with other polymerizable materials, particularly monovinyl benzenes.

The process of the present invention can also be used for forming an adherent carbon film on various surfaces. This is accomplished by forming a film of the hydrocarbon to be pyrolyzed and converting the film to carbon. The film can be formed on the surface of any material sufficiently stable and refractory to be subjected to the temperatures required for pyrolysis, such as ceramics, glasses, crystals, or metals having melting points substantially above the temperatures of pyrolysis. The coatings can be applied to rods, wires, spheres, tubes (both internally and externally) and other complex forms which it is difficult or impossible to cover with a coherent carbon layer by gas phase pyrolysis.

The hydrocarbon films, to be converted to carbon films, can be deposited in any convenient manner. Thus any of the liquid hydrocarbon monomers or monomer mixtures referred to above, containing a polymerization catalyst, can be coated on the surface and then maintained at a polymerizing temperature until a polymer of the required degree of cross-linking has been produced. Similarly, the monomer or a partially polymerized material which is still soluble may be dissolved in a volatile solvent, the solution may be coated on the surface, the solvent may be allowed to evaporate and the monomer or partially polymerized material may be further polymerized. This polymer film can be subjected to the inhibitor forming pretreatment, if required, and then to pyrolysis.

In the form of thin films, certain monomers or partially polymerized materials lend themselves to simultaneous polymerization and introduction of depolymerization inhibiting groups by air baking. This procedure furnishes one of the most convenient methods for forming carbon films by the process of the present invention. Monomers or low polymers of vinyl acetylene, or of related compounds containing both the vinyl and acetylene groupings such as divinyl acetylene or vinyl butadienyl acetylene, are particularly suited to this procedure. The monomer, or the partially polymerized material in an ungelled soluble state, may be dissolved in a volatile solvent such as naphtha and the solution may be coated on the surface on which the carbon film is to be formed.

After evaporation of the solvent in air at an elevated temperature, as from 60° C. to 80° C. a polymer film remains. This polymer film can have its cross-linking and resistance to depolymerization increased by further heating in air. This heating can be carried out over a range of temperatures lying between about 75° C. and about 200° C. At temperatures in the vicinity of 200° C. conversion of the polymer film to a form in which it can be converted with high yield (in excess of 50 per cent carbon based on the weight of the original polymer) to an adherent, coherent, glossy film of carbon is accomplished by heating for about one hour. As the temperature of heating is decreased, the time required for preparation of the polymer film increases until about sixteen hours of heating in air are required at temperatures in the vicinity of 75° C. in order to obtain a high yield. The final conversion to a carbon film is accomplished by simply heating in an inert atmosphere to a sufficiently elevated temperature. With the vinyl acetylenes, a carbon yield of up to 35 per cent can be obtained without any pretreatment prior to pyrolysis other than the initial polymerization in air.

The formation of highly cross-linked, depolymerization resistant hydrocarbons into various shapes for conversion by pyrolysis into carbon bodies has been described above. These hydrocarbons may also be formed as impregnants or binders for other organic or inorganic masses, such as natural and synthetic fibers (including cellulosic, silk or polyamide fibers, or carbon fibers produced as described above) or coke or carbon black particles. The hydrocarbons may be formed by the methods described above, as by impregnating or saturating the materials with a monomer or monomer solution and polymerizing the monomer. The entire mass can then be carbonized by the process of the present invention.

The formation of highly cross-linked hydrocarbon polymers has been described above as accomplished by the polymerization of hydrocarbon monomers of sufficient functionality. The hydrocarbon polymers can also be formed from linear or network polymers which contain only carbon atoms in the linear chains or networks but which also contain substituent atoms or radicals containing elements other than carbon and hydrogen, such as oxygen, nitrogen, sulfur or halogens, and which upon heating are converted to cross-linked hydrocarbon polymers. Thus, polyvinyl alcohol, which is an essentially linear polymer, evolves its oxygen in the form of water when heated to a temperature of 250° C. in a non-oxidizing atmosphere. The unsaturation introduced by the splitting off of the substituents results in extensive cross-linking so that, by the time substantially all of the oxygen has been driven off, as for instance after about fifteen hours at 250° C., a hydrocarbon polymer possessing adequate cross-linking for use in the process of the present invention has been produced.

Similarly, polyvinylidene chloride and polyvinyl chloride, both essentially linear polymers, evolve HCl when heated in inert or non-oxidizing atmospheres or in the presence of dehalogenating agents and yield cross-linked hydrocarbon polymers suitable for the purposes of the present invention.

Examples of other cross-linked polymers which contain elements other than carbon and hydrogen and which are converted to cross-linked hydrocarbon polymers upon heating in a non-oxidizing atmosphere are the polymers of vinyl acrylic acid, chlorovinyl acrylic acid, propenyl ethinyl carbinol, propenyl ethinyl ketone, vinyl ethinyl ketone, hex-3en-5yn-2ol and hex-3en-5yn-2one.

Regardless of the method of preparation, the hydrocarbon polymer should, as indicated above, be sufficiently cross-linked, prior to treatment, to render it resistant to depolymerization during subsequent pyrolysis, or in other words sufficiently cross-linked that it is incapable of swelling to more than five times its volume in a solvent having no substantial heat of solution. As indicated above, the most effective and convenient means for rendering such a cross-linked hydrocarbon polymer resistant to depolymerization is to subject it to a baking in air.

Best results are obtained by bringing the polymer to a temperature of about 250° C. during this baking. The effectiveness of this baking in air in retarding depolymerization increases with an increase in the time for which the baking is continued. Thus spheres formed of a polymer of the monomer mixture of divinyl benzene and ethyl styrene referred to above and having an average diameter of about 0.3 millimeter were found to lose in excess of 90 per cent of their initial weight by volatilization when subjected to a gradually increasing temperature, eventually reaching a maximum of 960° C., in an atmosphere of nitrogen. However, spheres of the same size and composition, after baking in air at 250° C. for one hundred and sixty hours, yielded lustrous coherent, strong, hard carbon spheres, having over half the original weight of the polymer spheres, after being subjected to the same pyrolytic heating procedure.

Air baking at 250° C. for shorter periods of time gave lower, but nevertheless substantial, yields. Thus, heating for twenty-four hours in air resulted in a carbon yield, after pyrolysis under the same conditions, of over 40 per cent of the original polymer. Air baking for eight hours gave a carbon yield of over 30 per cent and baking for four hours gave a yield of over 20 per cent. In each case, coherent, strong, hard, lustrous carbon spheres were produced.

Although it is possible to obtain a small but substantial increase in the yield of carbon by air baking for as little as two hours, it is ordinarily desirable for the baking to be continued for at least four hours. However, since it is desirable to obtain as high a yield as possible consistent with economical operation, it will usually be more preferable to bake for at least twenty-four hours and it may be desirable to bake for one week or even for two weeks.

The baking has been described above as preferably carried out at 250° C. This baking temperature can be varied somewhat, as between 200° C. and 300° C. Temperatures lower than this result in unduly slow development of depolymerization resistant properties. Higher temperatures result in carbon loss by oxidation. Preferably the polymer bodies are brought gradually from room temperature to the maximum baking temperature while in contact with air. Similar conditions may be maintained during baking in gases, other than air, which are capable of developing depolymerization resistant properties, as discussed above.

The pyrolysis of the pretreated hydrocarbon is carried out in a non-oxidizing atmosphere to prevent loss of carbon by oxidation. The most suitable atmosphere for this purpose is nitrogen at atmospheric pressure, although superatmospheric or subatmospheric pressures may be used if desired. Other atmospheres which are non-oxidizing, such as helium, hydrogen or a sufficiently high vacuum, may be used if desired.

The hydrocarbon bodies are brought gradually to the maximum temperature of pyrolysis so as to allow the gradual release of the gases which are developed and thus prevent destruction of the bodies. It has been found that a temperature rise of about 200° C. per hour between about 300° C. and the maximum temperature yields desirable results. Obviously the bodies may be heated more slowly if desired, as for instance at an average rate of about 5° C. per hour. A more rapid rate of heating, up to about 500° C. per hour, may also be used. It is apparent that, although the temperature increase can be made continuous, it is more readily brought about by stepwise increases, for instance of the order of 25° C. to 100° C.

The residual amount of hydrogen remaining in the final carbon product is dependent upon the maximum temperature to which the bodies are brought during pyrolysis for a substantial period of time. A product consisting of at least 99 per cent carbon can be produced by carrying the pyrolytic temperature to 850° C. and maintaining the material at this temperature for one-half hour or more.

In a typical product subjected to pyrolysis at a temperature increasing at the rate of 200° C. per hour until a temperature of 900° C. was reached and maintained at that temperature for one-half hour, the hydrogen content was found to be 0.64 per cent by weight. After being maintained at 1000° C. for one hour, the hydrogen content was reduced to 0.36 per cent. The hydrogen content was reduced further to 0.23 per cent by heating one hour at 1100°, to 0.12 per cent by heating one hour at 1200° C. and to between 0.02 per cent and 0.01 per cent by heating one to three hours at 1300° C. These values represent a hydrogen content of one hydrogen atom per twenty-three carbon atoms in the product heated to 1000° C. and one hydrogen atom per four hundred to eight hundred carbon atoms in the product heated to 1300° C.

The dehydrogenation proceeds without any substantial change in the shape of the original polymer body although the total volume, both apparent and actual, shrinks due to the loss of the hydrogen and a portion of the carbon by volatilization. When the initial polymer body is of a size exceeding 2 millimeters in cross-section, there may be a tendency for this shrinkage in size to cause a cracking and warping of the resulting carbon body.

This tendency of the body to crack and warp can be reduced or avoided by the application of mechanical pressure to the body during the dehydrogenation process. Pressures of the order of 2 to 10 pounds per square inch are ordinarily adequate to achieve these results although higher pressures may advantageously be used up to 100 pounds per square inch, 500 pounds per square inch or even 1,000 pounds per square inch.

Thus, when flat carbon plates are formed by the dehydrogenation of polymer sheets or of one or more layers of a textile fabric impregnated with the polymer, the sheets ordinarily tend to warp substantially during dehydrogenation. If the sheets are restrained, during dehydrogenation, between flat surfaces under a pressure of several pounds per square inch, this warpage is avoided.

Similarly, if other polymer shapes such as blocks having, for instance, cross sections of the order of one-half inch, are constrained in molds of the appropriate shape under pressures of the order of several pounds per square inch or more, cracking and warping during dehydrogenation will be eliminated or materially reduced. In such bodies, the presence of carbonizable fillers such as cotton flock, or preferably the presence of filaments or fabrics of carbonizable material, distributed throughout the polymer mass, act to reinforce the bodies and to assist in the reduction of cracking.

The application of pressure to the polymer body in the mold can be used not only to eliminate cracking but also to change the shape of the body. This change in shape can be accomplished since the polymer passes through a relatively plastic stage during a portion of its dehydrogenation. During this plastic stage, a polymer body of one shape can be formed into another shape by the pressure of the mold so that a carbon body having the shape of the mold is ultimately produced.

As indicated above, the electrical resistivity of the product at 25° C. varies between about $10^5$ ohm-centimeters for a hydrogen content of about 1 per cent and $10^{-2}$ ohm-centimeters or less (about three hundred times the resistance of single crystal graphite in the base plane) for a hydrogen content not exceeding about .02 per cent. The hardness of the product is higher than that of any carbon yet recorded, other than diamond.

These properties indicate that, although during pyrolysis the carbon network of the original hydrocarbon has undergone substantial rearrangement to the aromatic or graphitic configuration as occurs in the formation of pyrolytic carbons, nevertheless a substantial proportion of primary valence cross-links between the graphitic layers is retained and imparts substantial diamond-like characteristics to the product. The carbons of the present invention, which will be referred to hereafter as polymer carbon, therefore have a more cross-linked, less graphitic structure than any other known forms of carbon except diamond.

The existence of this type of structure is further indicated by a comparison of the X-ray diffraction pattern produced by polymer carbon with the patterns for graphite and the other known pyrolytic carbons, such as those obtained by the gas phase pyrolysis of hydrocarbons or the in situ pyrolysis of oxygenated polymeric materials. The pattern for graphite shows a large number of high angle maxima resulting from the high degree of order in the graphitic structure. These high angle maxima are absent in the patterns of not only polymer carbon but also other known pyrolytic carbons. However, the features which do appear in the patterns are much more diffuse for polymer carbon than for the other pyrolytic carbons, indicating a considerably lesser degree of order. This lesser order is presumably associated with a higher degree of cross-linking between graphitic planes.

Even more striking is the stability of the disordered structure when polymer carbon is heated to temperatures which recrystallize or graphitize ordinary pyrolytic carbon. Thus, a layer of pyrolytic carbon, such as is deposited on the inside of a carbon tube by passing benzene vapor or methane therethrough at 1000° C., is readily converted to graphite by heating several hours at 2400° C. In contrast, polymer carbon heated at 2400° C. for eight hours produced an X-ray pattern in which the features were somewhat less diffuse than those before heating at 2400° C. but in which there appeared no new orders or other features characteristic of graphite. This is extraordinary structural stability for disordered carbon and is further evidence of the extensive cross-linking between graphitic planes which appears to be responsible for some of the unique properties of polymer carbon.

Bodies of polymer carbon display intense sorptive capacity, quickly taking up helium, nitrogen, oxygen, water vapor and other gases when exposed to the atmosphere. The surfaces of these bodies exhibit an unusual smoothness. Electron micrographs of surface replicas of these surfaces at magnifications up to 14,000 show an essentially smooth surface with occasional small craters but with substantially no outward projections. The absolute density of the carbon is somewhat greater than 2. A comparison of the absolute volume of the carbon in the bodies with the apparent volume of the bodies shows that the carbon occupies in the vicinity of one-half the apparent volume, the remainder being made up of pores of exceptional fineness.

Because of this surface smoothness and freedom from outward projections, and because of the high sphericity obtainable in the production of polymer carbon spheres by the methods described above, masses of these spheres possess an exceptionally high fluidity. This fluidity can be characterized by the angle of repose of a mass of the spheres. The cotangent of the angle of repose is greater than 2 and has been measured as about 2.15.

When used as microphone granules in carbon microphones, polymer carbon bodies have been found to exhibit exceptionally high modulation efficiency. The modulation is measured as the ratio of the change in resistance of a mass of granules to the average resistance of the mass, when the mass is subjected to cyclical mechanical compression of a chosen frequency and amplitude. When measured in an enclosed vessel having one movable wall which oscillated at a frequency of 1,000 cycles per second and with an amplitude of several hundred angstroms, polymer carbon spheres, having diameters lying between about .25 millimeters and about .3 millimeters, were found to have a modulation of 33 per cent as compared with a modulation of 13 per cent for anthracite granules and about 17 per cent for quartz spheres coated with pyrolytic carbon deposited from a hydrocarbon in the gas phase as described, for instance, in United States Patent 1,973,703, issued to F. S. Goucher and C. J. Christensen. Even higher modulations (38 per cent) were obtained with mixtures of polymer carbon spheres and sphere agglomerates, of the same particle size, mixed in proportions such as to reduce the fluidity of the mass so that the cotangent of its angle of repose is 1.3, or close to the average fluidity of anthracite microphone granules.

Another advantage of the polymer carbon spheres or sphere-aggregate mixtures for microphonic purposes is the fact that the density lies within the desirable range for such use and can be varied to the optimum value for any particular microphone structure. The apparent density of the particles as determined by measuring the volume of the particles by the displacement of a liquid which does not wet the pores, such as alcohol, xylene or mercury, can be varied between about 1 gram per cubic centimeter and about 1.6 grams per cubic centimeter by selection of a polymer of a lesser or greater degree of crosslinking or by varying the degree of preliminary air baking or both, as described above.

The bulk density of a mass of the particles can be varied between about 0.6 gram per cubic centimeter and 1.2 grams per cubic centimeter by varying the factors referred to above as well as the particle size and particle size distribution in the mass.

This controllable density combined with the controllable fluidity and controllable resistivity considerably widen design potentialities for microphones in which the polymer carbon particles are to be used. Certain of these advantages are obtained whether the inherently good modulation of the polymer carbon surfaces is used or the polymer carbon granules are subsequently coated with a layer of pyrolytic carbon deposited from a hydrocarbon in the gas phase.

In the formation of polymer carbon spheres for microphonic use, it has been found that the presence of even minute amounts of oxygen and water vapor in the atmosphere during pyrolysis strongly affects the microphonic properties of the resulting carbon. The material is particularly sensitive to oxygen and water vapor during the final phase of the pyrolysis at temperatures from about 950° C. to 1200° C.

It has been found that the effect of the presence of oxygen or water vapor is to cause the formation of a thin surface layer of increased conductivity on the surface of the carbon particles. This film of increased conductivity increases the effective area of electrical contact between adjacent particles and reduces the resistance of a mass of the particles although the bulk resistivity is unchanged. Since the effective area of electrical contact is increased for a given area of mechanical contact, the change of contact resistance with increased area of mechanical contact is reduced and the modulation is correspondingly reduced.

Therefore, in order to achieve the best microphonic properties with satisfactory reproducibility, it is necessary to insure the exclusion of all oxygen and water vapor from the atmosphere of the pyrolytic furnace and to take extraordinary precautions to assure gas-tight furnace connections. When nitrogen is used to sweep the gaseous pyrolytic products from the furnace, it can be freed of oxygen and water vapor prior to its introduction into the furnace by adding about 15 per cent hydrogen and passing the mixture first through a palladium catalyst and then through a drying tower filled with granular calcium hydride.

The unique properties of polymer carbon spheres, and bodies of other shape, adapt them to a variety of other uses. The perfect sphericity of the spheres, coupled with their smoothness, hardness and availability in a variety of small sizes, make them well suited for forming ball bearings for instruments, watches and other delicate machinery.

Masses of polymer carbon spheres can be used as adsorbents for use with gaseous or liquid media. They can be used as filter beds and as catalytic materials. They can be used for forming chromatographic columns. The change in contact resistance between the spheres in the presence of certain gases makes them useful as electrical gas detectors. The high fluidity of the spheres and their stability at very high temperatures fits them very well for use as flowing high temperature heat transfer media.

Filaments of polymer carbon are useful as electrical resistance elements and as incandescent lamp filaments. For these uses, filaments of hydrocarbon polymer can be coiled to the required shape, about a base if necessary, prior to pyrolysis.

Refractory bodies coated with films of polymer carbon can be used for electrical resistors. The method of the present invention lends itself well to the formation of resistors in printed circuits. Microphone granules can be prepared by forming films of polymer carbon on spheres of quartz or other refractory material. Polymer carbon bodies or polymer carbon films on ceramic or metal bodies form excellent electrical contact surfaces for electrical switches. Polymer carbon films may also be formed as inert linings in crucibles or kettles.

The extreme hardness of polymer carbon makes it useful as an abrasive. The abrasive properties can be utilized by forming sharp-edged particles, as by the crushing of polymer carbon spheres or other shapes or by scraping flakes of a polymer carbon film from a base on which it is formed. These particles can be used as a substitute for diamond dust for some purposes and can be formed, with conventional binders, into abrasive-coated papers and fabrics, grinding wheels or similar devices.

Similar flakes which are exceedingly thin and of small particle size can be used as fillers or pigments for plastics, paints and rubbers in place of carbon. Due to their flake form, these particles are exceptionally effective in forming a light screen to protect the plastic or rubber from deterioration and they have good hiding power when used in paints. Where electrically conductive plastic or rubber compositions are desired, particularly effective fillers are formed from thin filaments of polymer carbon which break up to form thin rods of small particle size. The shape of these particles is such as to maintain effective electrical contact between them when they are present in sufficient concentration.

The description above has been concerned primarily with the formation of materials which have been dehydrogenated to a hydrogen content not exceeding 1 per cent hydrogen by weight by heating to temperatures above 850° C. However, as indicated above, products with useful, though different, properties are obtained with much lesser degrees of dehydrogenation by heating at lower temperatures.

Dehydrogenation of cross-linked hydrocarbon polymers, and resultant rearrangement of the basic carbon configuration, begins with heating at even relatively mild temperatures. This can be observed by forming a cross-linked hydrocarbon polymer either as a self-supporting film or as a coating on a transparent base such as glass and subjecting the polymer to heating in an inert atmosphere. A film of a polymer of two parts of divinyl benzene and three parts of ethyl vinyl benzene was, prior to heating, transparent throughout the visible spectrum with a relatively sharp cut-off in the ultra-violet region. Heating the film at 200° C. for one-half hour shifts this cut-off to longer wavelengths at the violet end of the visible spectrum. Heating at 400° C. for one-half hour shifts the cut-off to the blue-green region of the visible spectrum. Further heating shifts the absorption band further toward the red end of the spectrum. Films of any of the polymers described above as sources of polymer carbon, when treated in the manner, form useful optical filters.

The absorption spectra of these substances, as they go through progressive dehydrogenation with heating, show the progressive changes in electronic energy levels in the polymer structures, which, as the absorption shifts toward the red, become electronic semiconductors and photoconductors.

As indicated above, there is a limit to the dehydrogenation of divinyl benzene and other polymers which can be accomplished by heating before the predominant reaction becomes one of depolymerization, unless provision is made for inhibiting the depolymerization. Optical filters as described above can also be made by heating in air up to the required temperature, not exceeding about 250° C. and, if desired, heating to higher temperatures in nitrogen or other non-oxidizing atmosphere.

Films of polyvinyl acetylene, formed by polymerization in air at 85° C. exhibit a similar optical effect but are subject to readier dehydrogenation in the 200° C. to 400° C. range. Films which show a cut-off in the blue region of the visible spectrum after polymerization in air at 85° C. have this cut-off shifted to approximately the yellow region after heating in nitrogen to 200° C. for one-half hour, and to or below the red region after heating in nitrogen to 400° C. for one-half hour. This readier dehydrogenation appears to be due largely to the effects of heating in air at even the mild temperature of 85° C. and also to the inherent nature of the polymer itself.

Useful optical filters can be obtained with cross-linked hydrocarbon polymers which have been dehydrogenated, by heating, to a hydrogen content between about 3 per cent and about 6 per cent by weight of the dehydrogenated material, covering cut-off ranges from the upper end of the visible spectrum for the less dehydrogenated material to well into the infra red region for the more highly dehydrogenated material.

Within this range of dehydrogenation the materials develop photoconductive properties. These photoconductive properties are found with a range of dehydrogenation corresponding to a hydrogen content extending from about 5 per cent to about 1 per cent by weight of the dehydrogenated material. These dehydrogenated hydrocarbon polymers are thus useful for forming photoconductive devices such as radiation counters. Dehydrogenated materials falling within this range also exhibit large negative temperature coefficients of resistance and are useful for forming thermistors. The dehydrogenated materials are prepared by the same techniques as described above in connection with the more highly dehydrogenated polymer carbon, except that the final pyrolysis is carried out at a lower ultimate temperature at which the amount of hydrogen remaining in the product falls within the ranges set forth above. These temperatures will vary between 400° C. and 850° C. depending upon the degree of dehydrogenation desired and upon the nature of the original hydrocarbon polymer.

The invention has been described in terms of its specific embodiments and, since certain modifications and equivalents may be apparent to those skilled in the art, this description is intended to be illustrative of, but not necessarily to constitute a limitation upon the scope of the invention.

What is claimed is:

1. The method which comprises subjecting to addition polymerization a polymerizable hydrocarbon material having an average functionality in addition polymerization of at least 2.4 and containing at least 20 per cent by weight of divinyl benzene, heating the resulting polymer in air at a temperature between 200° C. and 300° C. for at least two hours and heating the resulting material at a temperature of at least 400° C. in a non-oxidizing atmosphere.

2. The method described in claim 1 wherein the polymerizable hydrocarbon material consists of divinyl benzene and another vinyl benzene.

3. The method described in claim 2 wherein the polymerizable hydrocarbon material consists of divinyl benzene and ethyl vinyl benzene.

4. The method described in claim 3 wherein the final heating in a non-oxidizing atmosphere is carried out at a temperature of a least 850° C.

5. The method described in claim 4 wherein the polymerization of the polymerizable hydrocarbon material is carried out in aqueous suspension to produce polymer spheres.

6. The method of forming a body of carbon which comprises forming a body of a polymer by subjecting to addition polymerization a polymerizable material made up of at least one hydrocarbon monomer, said polymerizable material having an average functionality in addition polymerization of at least 2.4, heating said body in an oxygen-containing atmosphere for at least two hours at a temperature between 200° C. and 300° C. and dehydrogenating said body by heating it to a temperature of at least 850° C. in a non-oxidizing atmosphere until the hydrogen content has been reduced to not more than 1 per cent by weight of the carbon.

7. The method described in claim 6 wherein the polymerizable material has an average functionality of at least 6.

8. The method described in claim 7 wherein the polymerizable material is vinyl acetylene.

9. The method of forming a body of carbon which comprises heating, in air for at least two hours at a temperature between 200° C. and 300° C., a body of a hydrocarbon, which hydrocarbon is insoluble in all known solvents without said solvents' altering the chemical structure of said hydrocarbon, the equilibrium swelling of which in a thermodynamically inert solvent does not exceed fivefold, and dehydrogenating said body by heating in a non-oxidizing atmosphere to a temperature of at least 850° C.

10. The method of forming carbon spheres comprising subjecting to addition polymerization a polymerizable material, having an average functionality in addition polymerization of at least 2.4 and made up of at least 20 per cent by weight of divinyl benzene, in suspension in an aqueous medium, heating the resulting polymer spheres in air at a temperature of about 250° C. and dehydrogenating said spheres by heating them in a non-oxidizing atmosphere at a rate such that, at temperatures above 300° C. their temperature does not increase at a rate greater than 500° C. per hour and continuing said heating until a temperature of at least 850° C. is reached.

References Cited in the file of this patent

UNITED STATES PATENTS

| Number | Name | Date |
|---|---|---|
| 2,060,035 | Chaney | Nov. 10, 1936 |
| 2,222,188 | White | Nov. 19, 1940 |
| 2,372,001 | Joyce | Mar. 20, 1945 |
| 2,502,183 | Swallen | Mar. 28, 1951 |

FOREIGN PATENTS

| Number | Country | Date |
|---|---|---|
| 329,652 | Great Britain | May 21, 1930 |

OTHER REFERENCES

Pfeiffer, The Properties of Asphaltic Bitumen, Elsevier, 1950, pages 15 and 24 to 26.